W. A. UTTZ.
PARACHUTE EQUIPPED AEROPLANE.
APPLICATION FILED JUNE 1, 1917.
1,254,947.
Patented Jan. 29, 1918.
4 SHEETS—SHEET 1.
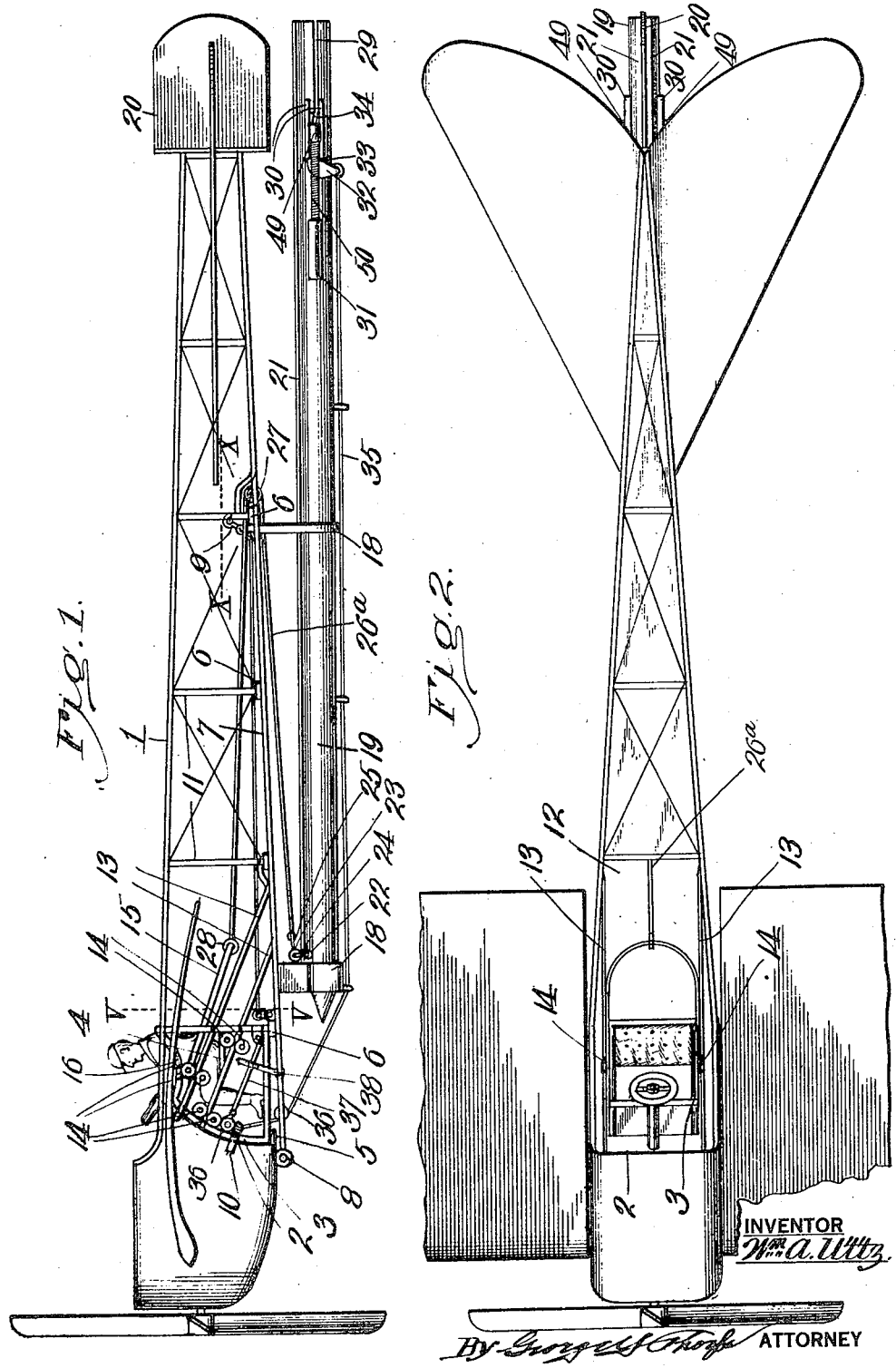
INVENTOR
Wm A. Uttz
By George ... ATTORNEY

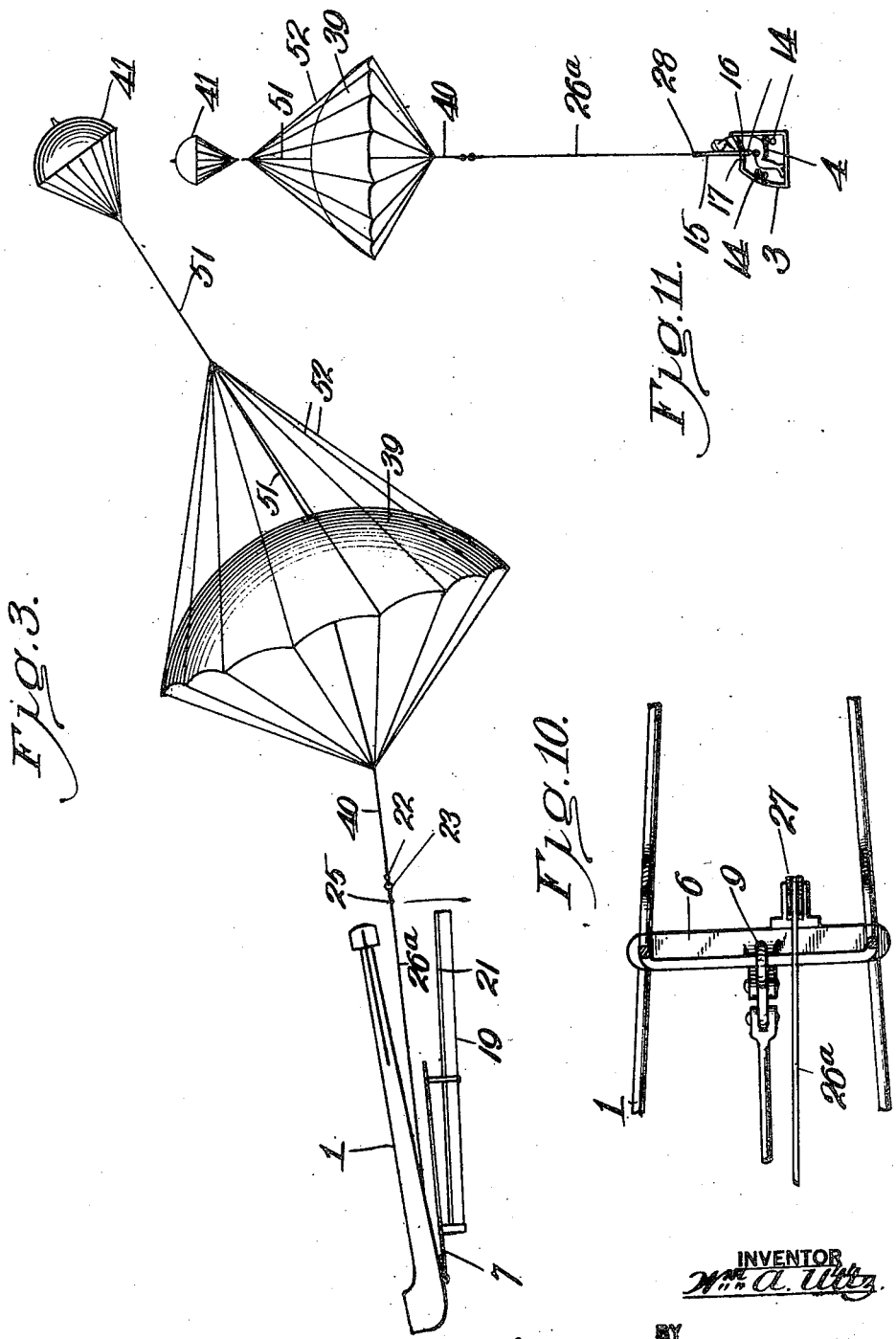

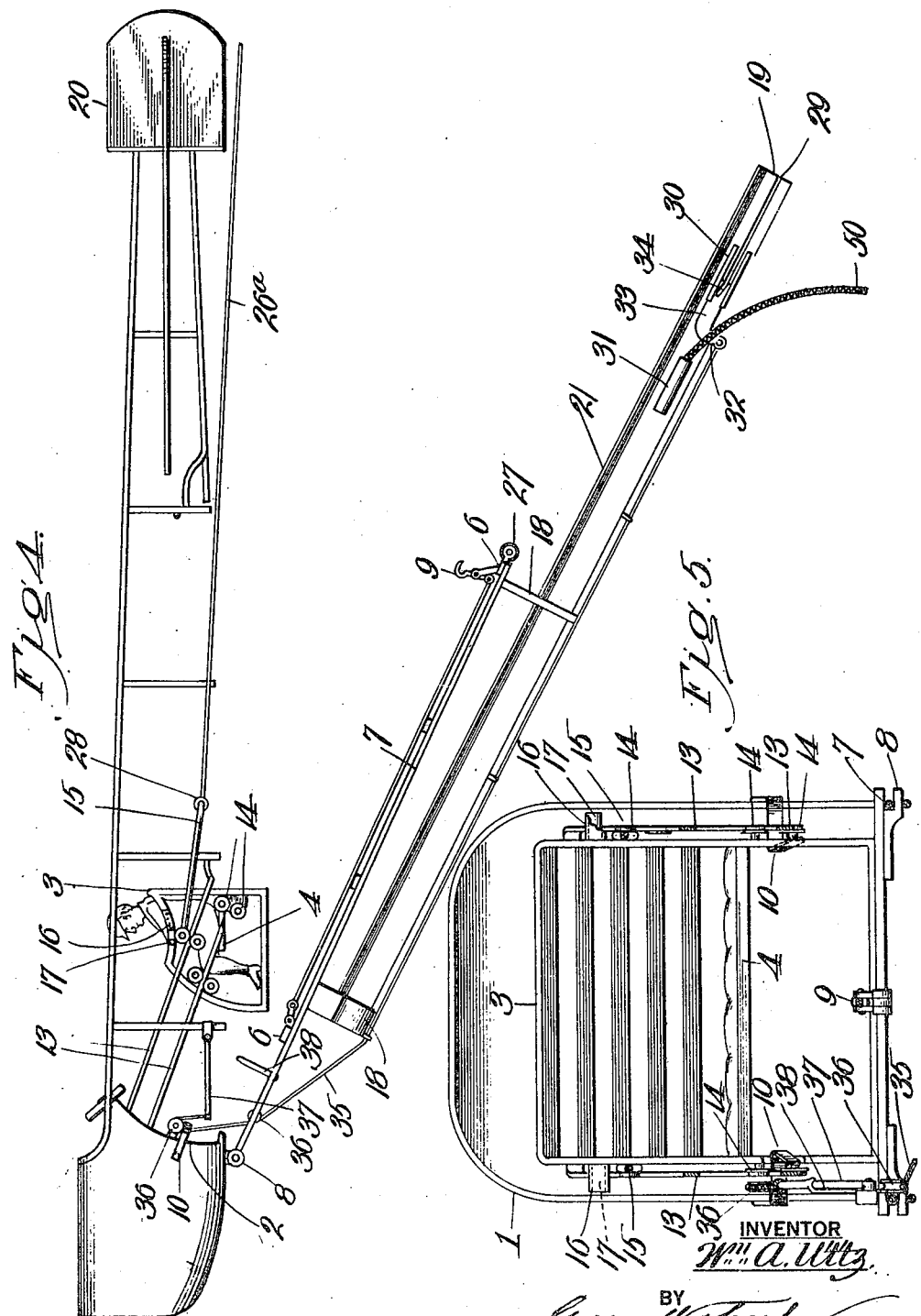

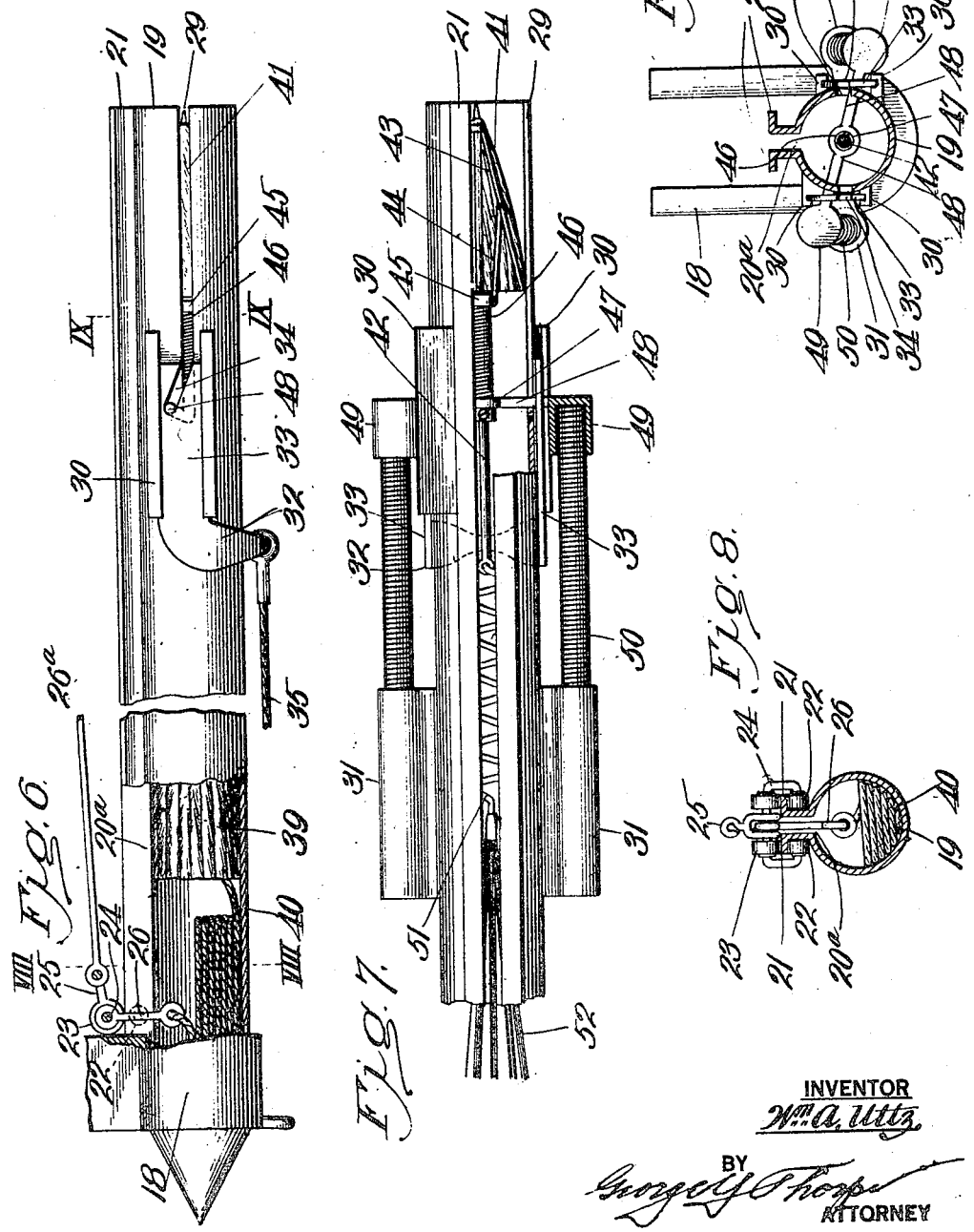

UNITED STATES PATENT OFFICE.

WILLIAM A. UTTZ, OF KANSAS CITY, MISSOURI.

PARACHUTE-EQUIPPED AEROPLANE.

1,254,947.   Specification of Letters Patent.   Patented Jan. 29, 1918.

Application filed June 1, 1917. Serial No. 172,825.

*To all whom it may concern:*

Be it known that I, WILLIAM A. UTTZ, a citizen of the United States, residing at Kansas City, in the county of Jackson and State of Missouri, have invented certain new and useful Improvements in Parachute-Equipped Aeroplanes, of which the following is a specification.

This invention relates to parachute equipped aeroplanes, and my object is to produce improvements in such machines whereby the tripping of a catch shall be instantly followed by the automatic setting of a parachute and the withdrawal from the aeroplane of the driver's cage thereof through the pull of the parachute, and the safe lowering of said cage by the parachute.

With this general object in view the invention consists in certain novel and peculiar features of construction and combinations of parts, as hereinafter described and claimed; and in order that it may be fully understood reference is to be had to the accompanying drawings, in which:

Figure 1, is a side elevation of a parachute aeroplane embodying my invention.

Fig. 2, is a plan view of the same with the wings or planes broken away.

Fig. 3, is a diagrammatic view showing the parachute in the position it occupies as it opens preliminarily to effecting detachment of the cage from the aeroplane.

Fig. 4, is a side view of the aeroplane as the parachute is in the act of detaching the cage.

Fig. 5, is an enlarged cross section on the line V—V of Fig. 1.

Fig. 6, is an enlarged fragmentary view, partly in elevation and partly in section of the parachute container and part of the mechanism associated directly therewith.

Fig. 7, is a view showing the rear end of the container partly in plan view and partly in section.

Fig. 8, is a vertical section on the line VIII—VIII of Fig. 6.

Fig. 9, is a section on the line IX—IX of Fig. 6.

Fig. 10, is an enlarged horizontal section on the line X—X of Fig. 1.

Fig. 11, is a diagrammatic view showing the cage suspended from the parachute.

Referring to the drawings in detail, 1 indicates the fuselage of an aeroplane, shown in this instance as of the monoplane type. The machine is provided at the front end of the fuselage with a well 2 containing a detachable cage 3 provided with a seat 4 for the driver. The cage may be supported in position in any suitable manner but is shown as resting upon a shelf 5 rigid with the frame of the machine and the foremost of a series of cross bars 6 of a movable section 7 of the bottom of the fuselage, said section being hinged to the frame work at 8 and secured at its rear end by latch 9 to a permanent part of the fuselage, the arrangement being such that a heavy rearward pressure applied on the latch of said section shall trip the same preliminary to effecting opening movement of said section.

To normally hold the cage resting conjointly upon shelf 5 and said cross bar 6, spring catches 10 secured to the frame work, engage the cage, but the same power which is exerted to effect the unlatching of the hinged section 7 of the fuselage, is effective in disengaging the cage from the catches 10.

The vertical side struts 11 of the fuselage for the length of the section 7 extend through the underlying cross bars 6 of said section 7 and are braced by said cross bars, and said struts are likewise braced by the usual cross bracing or in any other suitable manner, this being also true of the bottom and top of the fuselage except the first panel of the top of the latter to the rear of the cage, the crossed bracing being omitted at such point so as to provide an opening 12, for a purpose which is hereinafter explained.

Sets of parallel tracks 13 are located at opposite sides of the cage, and secured at their front ends to the sides of the machine frame and extend downwardly and rearwardly therefrom. The tracks are also secured to and at the inner sides of the foremost vertical struts 11 of the fuselage, and the uppermost tracks are additionally secured at their rear ends to the next pair of struts 11. 14 indicate sets of guide wheels arranged in a triangular relation at opposite sides of and mounted in any suitable manner on the cage, the two lower pairs of wheels of each set engaging the upper and lower edges of the undermost tracks 13, and the remaining pair of wheels of each set, its respective upper track, the arrangement being such that when the cage is drawn rearwardly it is maintained in an upright position, and the inclination of the tracks is such that the cage moves downwardly at an angle which will carry the driver's head through the opening 12 at a safe distance below the foremost cross bar of the top of the fuselage. In this connection it should be stated that the rearward movement of the cage is instrumental in effecting opening movement of section 7 of the fuselage, and that hinged to the cage is a bail 15 by which the cage is suspended and maintained in an upright position, when being lowered to the ground as hereinafter explained, the bail when swung to an upright position repressing a pair of spring catches 16, on the car and then striking and being arrested by a pair of stops 17, the catches instantly returning to normal position to retain the bail between them and the said stops.

Referring now to the parachute mechanism, 18 is a pair of collars rigidly secured to and depending from hinge section 7 of the fuselage, and extending through and secured to said collars is a cylindrical tube or container 19, the same terminating adjacent to the rear end of the vertical rudder 20 of the machine. Container 19 is provided for substantially its full length with a slot 20ᵃ and is angularly flanged upward at opposite sides of the slot to form a double track 21, for a carriage comprising sets of rollers 22 and 23 respectively, journaled on a frame 24, and pivoted to the said carriage between the upper rollers is a bifurcated link 25, and a draft rod 26, the latter extending through slot 20ᵃ into the container. The link 25 is attached to a cable 26ᵃ extending rearwardly and then upwardly and forwardly over a guide sheave 27 on the rear cross bar of section 7, and to the bail to which it is swiveled at 28, the arrangement being such that the section 7 is free to swing downward without interference with the cable, as hereinafter explained.

The container is provided at its rear end and opposite sides with a pair of bayonet slots 29, a pair of tracks 30 at opposite sides of each of said slots, and outwardly-projecting rearwardly facing sockets 31 at the front ends of said slots.

A yoke 32 fits around the container and is provided with rearwardly-projecting parallel arms 33 fitting between the guide tracks 30 and having reversely inclined slots 34 intersecting the bayonet slots 29, and said yoke is connected by a cable 35, extending over suitable guide sheaves 36, to a lever 37, operable by the driver, and held against accidental movement by a latch mechanism 38, the arrangement being such that when he operates said lever, sliding movement of the yoke is effected for a purpose which hereinafter appears.

Folded like an umbrella and fitting in the container is a parachute 39, and attached centrally thereto is a cable 40 having slack of greater length than the container and attached to the lower end of rod 26. Arranged in the rear end of the container is a small parachute member 41, provided with a central stem 42, pivoted ribs 43, and pivoted braces 44, connecting the ribs to a sleeve 45, slidable on the said stem, a spring 46 being mounted on the stem, and bearing on sleeve 45 and a fixed collar 47, on the stem, for the purpose of imparting opening movement to the parachute member when not held closed within the container, this parachute member corresponding substantially in construction and operation to a small umbrella except in regard to the spring and fixed collar, whereby said member is automatically opened or started on its opening movement. The collar is provided with arms 48 projecting outwardly through the bayonet joint slots 29, and the reversely inclined slots 34 of the slidable yoke 32. The arms 48, when in position, engage the transverse portions of slots 29, and to hold the said arms in such position normally they are provided with forwardly-facing sockets 49 receiving the rear ends of a pair of springs 50 fitting at their front ends in the sockets 31, fixed to the container, the pressure of said springs guarding against such movement of said arms as shall dispose them in the longitudinal portions of said bayonet joint slots and thereby guard against accidental projecting of the parachute member out of the rear end of the container. The stem of the parachute member is connected by a slack cable 51 with the central portion of the parachute 39, and by means of a series of diverging cables 52 with the said parachute 39 at the periphery thereof, so that the pull of the parachute member when free from the container shall after pulling the parachute 39 out of the container, insure the instant opening or partial opening of the parachute.

Assuming that the parts are in normal position as described and shown in Fig. 1, and that the aviator loses control of the machine and is convinced that he cannot reacquire control, he operates the lever 37 and thereby slides the yoke 32 forward and through the inclined slots thereof, swings arms 48 into the longitudinal portions of slots 29. The instant this occurs the springs 50 expand and slide said arms and hence the parachute member 41, rearwardly until said member emerges from the rear end of the container. As this is accomplished, said member opens and under the air resistance takes up the slack of the cable 51 and pulls the parachute 39 rearwardly through and out of the rear end of the container, the cables 52 under the pull of the parachute member, partly opening the parachute after it emerges from the container so that the air shall instantly complete such opening movement. As this occurs the parachute will be in substantially the position shown in Fig. 3, and the parachute member will occupy substantially the position shown in the same figure, as its tendency will be to move upward under the air pressure and assume an upright position, and in this action it will of course tend to facilitate the assumption of a similar position by the parachute. Before the latter however will assume such a position, it will have withdrawn the slack cable 40 completely from the container, the carriage traveling along and off the rear ends of tracks 21 and straightening the cable 26ª. As this occurs the parachute will offer such resistance to forward movement of the aeroplane that it will start to draw the cage rearward. As the cage is thus moved it will trip the latch 9, and of course be compelled by reason of the inclined guide tracks and wheels, to apply sufficient pressure on the foremost cross bar 6 of member 7, to force said member downward. Fig. 4 represents approximately the position which the cage will have attained by the time the member 7 has swung downward sufficiently to be out of the path of the cage. It will be noted in this connection that the container swings downward with the member 7 so as to leave the cage free to slide off the rear ends of tracks 13. By the time this action occurs, which of course is almost instantaneous, the aeroplane lacking control, will have tilted downward and forward and by the time it has started to fall its momentum will have carried it forward beyond the cage so that the driver will be in practically no danger of being struck by the falling machine, it being obvious of course that the instant the cage clears the rear ends of said tracks, it will swing downward, because it is connected to the parachute only through the medium of the cables 26ª and 40 and said carriage and bail. The latter of course will be connected to the cage in such manner that the latter will be balanced so that it shall assume a substantially upright position and be locked as explained, in such position, regardless of the swing of the cable and the rocking of the parachute which will occur particularly as it first takes up the burden of the suspended cage. It will of course be understood that with this appliance it will be essential that the occupant or occupants of the cage shall be securely strapped therein to guard against dislodgment when suspended from the parachute or by the jerk which is imparted to the cage when the parachute first opens.

From the above description it will be apparent that I have produced a device of the character described which possesses all of the features enumerated as desirable and while I have illustrated and described the preferred form of the invention, it is to be understood that I reserve the right to all changes properly falling within the spirit and scope of the appended claims.

I claim:

1. An aeroplane having a fuselage, a seat detachably secured in the fuselage, a hollow container secured to and at the underside of the fuselage, a folded parachute within the container, a suitably guided flexible connection between the parachute and said seat, and manually-controlled means for freeing the parachute from the container to cause the former to open and through said flexible connection draw the seat rearwardly and downwardly and disengage it from the fuselage.

2. An aeroplane having a fuselage provided at its lower side with a movable section, a seat slidably secured in the fuselage above the movable section thereof, a container carried by and beneath the fuselage, a folded parachute within the container, a suitably guided flexible connection between the parachute and said seat, and manually controlled means for freeing the parachute from the container to cause the former to open and through said cable pull the seat downward through the fuselage and against said movable section to force the latter out of its path.

3. An aeroplane having a section of the lower side of its fuselage movable from position, means for latching said section in closed position, a seat detachably secured in the aeroplane above said movable section of the fuselage, a folded parachute within a container, a suitably guided flexible connection between the parachute and seat, and manually controlled means for freeing the parachute from the container so that it may open and cause said cable to draw the seat rearwardly and downwardly through the fuselage and trip said latch mechanism and effect movement of the fuselage section from its path.

4. An aeroplane having a section of the lower side of its fuselage movable from position, a cage detachably secured in the aeroplane above said movable section, means for drawing the cage rearwardly in the fuselage, and means for guiding said cage downward in its rearward movement to cause it to apply pressure on said section of the fuselage to move same out of position.

5. An aeroplane having a fuselage, a seat detachably secured in the fuselage and provided with a bail, a hollow container secured to and at the underside of the fuselage, a folded parachute within the container, a suitably guided flexible connection between the parachute and said bail, and manually-controlled means for freeing the parachute from the container to cause the former to open and through said flexible connection draw the seat rearwardly and downwardly and disengage it from the fuselage.

6. An aeroplane having a fuselage, a seat detachably secured in the fuselage and provided with a bail, a hollow container secured to and at the underside of the fuselage, a folded parachute within the container, a suitably guided flexible connection between the parachute and said bail, manually-controlled means for freeing the parachute from the container to cause the former to open and through said flexible connection draw the seat rearwardly and downwardly and disengage it from the fuselage, and means carried by the seat to engage the bail when extending substantially upright from the seat, to retain the latter in an upright position when suspended from the parachute.

7. An aeroplane having a section of the lower side of its fuselage movable from position, a cage detachably secured in the aeroplane above said movable section, a folded parachute carried by the fuselage, means for shifting the parachute to open position at the rear end of the fuselage to offer resistance to travel of the aeroplane, and a connection between the parachute and the cage to impart movement to the latter in a rearward direction relative to the aeroplane, when the parachute opens, to effect the withdrawal of the cage from the aeroplane.

8. An aeroplane having a section of the lower side of the fuselage movable from position, a cage detachably secured in the aeroplane above said movable section, a folded parachute supported under the fuselage, means for shifting the parachute endwise to the rear of the fuselage and to open position to oppose resistance to travel of the aeroplane, and a connection between the parachute and the cage to impart relative rearward movement to the latter in the fuselage, when the parachute opens, to withdraw the cage from the aeroplane.

9. The combination with an aeroplane having a detachable cage, of a container carried by the aeroplane, a parachute within the container, a flexible connection between the parachute and the cage, a small parachute member rearward of the parachute and connected thereto, within the container, spring-actuated means for ejecting the parachute member from the container, and manually controlled means for preventing ejecting action by said spring-actuated means.

10. The combination of an aeroplane having a detachable cage, a longitudinally extending container provided with a longitudinal slot and tracks at opposite sides of said slot, a carriage mounted on said track and capable of rolling off the rear ends thereof, a flexible connection between said carriage and said cage, a folded parachute in the container, a flexible connection between the parachute and said carriage by way of said slot, and means for withdrawing the parachute from the container rearward of the aeroplane to cause said parachute to open and through said flexible connections and carriage withdraw the cage from the aeroplane.

11. The combination with an aeroplane having a detachable cage, of a slotted container underlying the cage, a parachute in the container, a suitably guided flexible connection between the parachute and cage and extending through said slot, a small parachute member in the rear end of the container, spring-actuated means tending to eject the parachute member from the container, a bayonet slot connection between the container and the parachute member to prevent such ejection, and manually controlled means for effecting movement whereby the spring-actuated means shall be enabled to effect ejection of the parachute member.

12. The combination of an aeroplane having a detachable cage, a longitudinally extending container provided with a longitudinal slot and tracks at opposite sides of said slot, a carriage mounted on said tracks and capable of rolling off the rear ends thereof, a flexible connection between said carriage and said cage, a folded parachute in the container, a flexible connection between the parachute and said carriage by way of said slot, a folded parachute member in the container rearward of the parachute, a cable connecting the parachute member with the parachute, manually-controlled spring-actuated means for ejecting the parachute member rearwardly from the container, and spring-actuated means for opening the parachute member when free from the container, to cause it to withdraw the parachute from the container to effect the detachment of the cage from the aeroplane.

In testimony whereof, I affix my signature.

WILLIAM A. UTTZ.